UNITED STATES PATENT OFFICE.

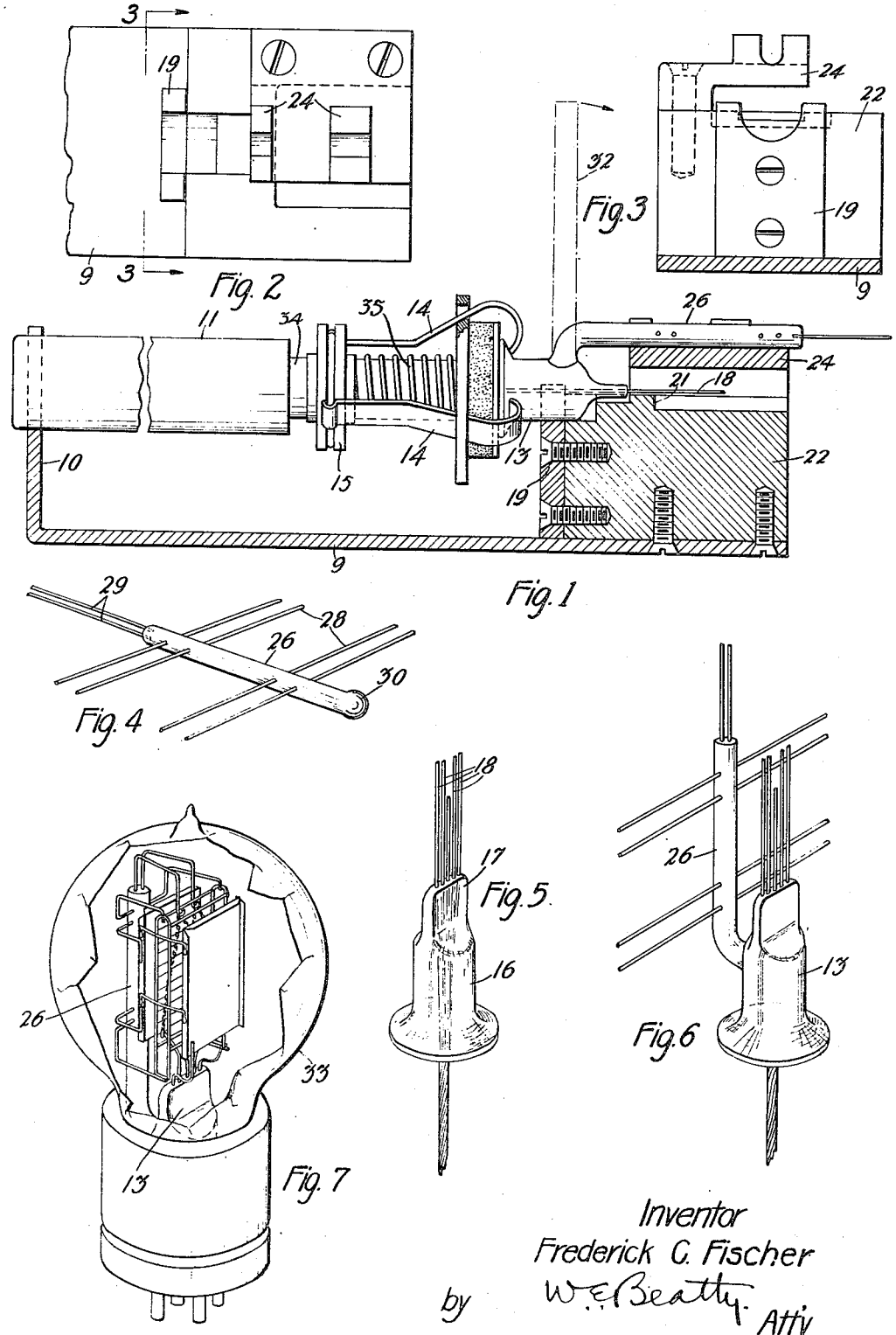

FREDERICK C. FISCHER, OF BERWYN, ILLINOIS, ASSIGNOR TO WESTERN ELECTRIC COMPANY, INCORPORATED, OF NEW YORK, N. Y., A CORPORATION OF NEW YORK.

VACUUM-TUBE MANUFACTURE.

1,409,339.  Specification of Letters Patent.  Patented Mar. 14, 1922.

Application filed October 15, 1919. Serial No. 330,783.

*To all whom it may concern:*

Be it known that I, FREDERICK C. FISCHER, a citizen of the United States, residing at Berwyn, in the county of Cook, State of Illinois, have invented certain new and useful Improvements in Vacuum-Tube Manufacture, of which the following is a full, clear, concise, and exact description.

This invention relates to vacuum tube manufacture and more particularly it relates to a jig for holding the parts of an electrode supporting structure while they are being assembled and positioned with respect to each other.

In vacuum tubes containing a plurality of spaced electrodes, it is frequently desirable to employ an electrode supporting structure which consists of a stem sealed to the base of the tube and projecting within the tube. The electrodes are supported from a glass arbor or rod which projects from the side of the stem and which is bent so as to extend parallel to the main axis of the tube. This supporting structure is manufactured by supplying sufficient heat to one end of the rod so as to seal it to the side of the stem. The rod is then bent while heated so that its main portion is parallel to the axis of the stem whereupon it is allowed to cool.

This invention comprises a jig which may be employed in this process of manufacture to insure that the rod or arbor is bent properly with respect to the stem. The jig comprises a frame in which suitable means for holding the stem is used. The arbor is heated at one end and applied to the stem whereupon the arbor is bent over into proper position with respect to the stem and allowed to cool. The position the arbor assumes is determined by a horizontal platform which extends from one end of the frame. By bending the arbor down until it rests upon this platform, the accurate positioning of the arbor is always assured.

This invention will be better understood by reference to the following detailed description taken in connection with the accompanying drawings, in which Fig. 1 represents the preferred embodiment of this jig; Fig. 2 is a plan view of one end of the same; Fig. 3 is a cross-sectional view taken near one end; Fig. 4 shows in detail the arbor, and Fig. 5 illustrates the stem which is to be employed in connection with the jig shown in Fig. 1; Fig. 6 illustrates the completed supporting structure which has been formed by means of the jig shown in Fig. 1; Fig. 7 shows the supporting structure of Fig. 6 employed to support a plurality of electrodes in a vacuum tube of the three-electrode type.

Referring to Fig. 1, the jig comprises a base plate 9 having at one end an upright member 10 which is grooved. This member 10 is adapted to support one end of a holder 11 at the other end of which the stem 13 is suitably clamped. The specific clamping means shown comprises a plurality of spring clips 14 which are attached to a collar 15 which is slidably mounted on the rod 34 of the holder. The clips 14 hold the stem 13 tightly in place on account of the action of the coiled spring 35. This holder, however, is not a part of this invention, but is described and claimed in an application of Thronsen, filed October 22, 1919, Serial No. 332,444. The stem 13 is shown in detail in Fig. 5 and comprises a cylindrical portion 16, and a press 17 from which project a plurality of wires 18 in a direction parallel to the axis of the stem. The cylindrical portion 16 of the stem rests in a groove in the upper end of upright member 19 of the frame. Wires 18 are adapted to rest on a ledge 21 of the block 22 which is suitably fastened to the base plate 9. The bottom of the groove in platform 24 which projects above block 22 should be in a plane parallel to the main axis of stem 13 when the stem is in the position shown in Fig. 1.

As shown in Fig. 4 the arbor which is to be employed with stem 13 comprises a glass rod 26. Electrode supporting wires 28 and 29 project from the rod 26 at suitable points. After the stem 13 has been inserted in the holder 11, the holder may be supported by member 10 and the stem may be allowed to rest on the support 22 as shown in Fig. 1. The end 30 (Fig. 4) of arbor 26 should then be heated and applied to stem 13 so that it may become sealed thereto. While the sealing is taking place, rod 26 should be held in the position shown at 32 (Fig. 1). As soon as the sealing has taken place, the rod should be bent in the direction shown by the arrow in Fig. 1 until it rests in the groove in platform 24. The arbor 26 therefore will lie in a plane parallel to the main axis of the stem 13.

The completed supporting structure is shown in Fig. 6 where rod 26 projects from the side of the stem 13 and extends in a direction parallel to the main axis thereof.

Fig. 7 shows the supporting structure of Fig. 6 incorporated in a vacuum tube 33 of the audion type.

It is obvious that the platform 24 may be so modified as to give the arbor any desired space relation with respect to its supporting stem.

What is claimed is:

1. A device for manufacturing a structure comprising a stem and a rod, said device comprising a support for said stem, and a projection on said support for determining the space relation of said stem and said rod.

2. A device for manufacturing a structure comprising a stem and a rod, said device comprising a base plate, a support for said stem projecting from said plate, and a platform projecting from said plate beyond said support for determining the distance between the axis of said rod and said stem.

3. A frame for manufacturing a supporting structure comprising a tubular member of refractory material, and an arbor which is to be attached to a side of said member, said frame comprising means for supporting said member and a platform carried by said supporting means to the level of which said arbor is adapted to be bent in order to determine the space relation of said members and said arbor.

4. A framework for manufacturing a supporting structure comprising a glass stem and an arbor which is to be attached to a side of said stem, said framework comprising a base plate, supporting means arising from said base plate for said stem, and a grooved platform attached to said base plate, said platform being so positioned that when said rod is bent to occupy said groove, said rod has it main portion projecting in a direction substantially parallel to said stem.

5. A device for manufacturing a supporting structure comprising a stem and an arbor which is to be attached to said stem, said device comprising a holder for said stem, a base plate, supporting means arising from said plate adapted to support said holder, a second supporting means arising from said plate adapted to support said stem, and a projection on said second supporting means for determining the space relation of said stem and said arbor.

6. A device for manufacturing a structure comprising a tubular member and a rod of refractory material, said device comprising a holder for said tubular member, a support for said member, a support for said holder, and a platform for determining the distance between the axis of said rod and said member.

7. A frame for manufacturing a structure comprising a rod of refractory material and a tubular member having a flared portion, said frame comprising a holder releasably secured to the flared portion of said member, a base plate, a support for said holder arising from said plate and adapted to contact with said holder, a support for said rod arising from said plate and adapted to contact with said rod, and a platform integral with said second support for determining the distance between the axis of said rod and said member.

8. A device for manufacturing a structure to be used in a vacuum tube, comprising a stationary holder for an element of said structure, supporting means for said holder, and supporting means for said element.

9. A device for manufacturing part of an electrode structure of a vacuum tube comprising a stationary holder for releasably securing an element of said structure, supporting means for said holder, supporting means for said structure, and means for determining the relation of another element of said structure to said first-mentioned element.

10. A device for manufacturing an electrode supporting stem of a vacuum tube comprising a holder for releasably securing a stem having a tubular portion, and a gauge for supporting said stem.

11. A device for manufacturing an electrode supporting stem of a vacuum tube comprising a holder for releasably securing a stem having a tubular portion, and a gauge for supporting said stem, said gauge comprising a plurality of platforms one of which is adapted to support said tubular portion and another of which is adapted to support a rod to be attached to said stem.

In witness whereof, I hereunto subscribe my name this 6 day of Oct., A. D., 1919.

FREDERICK C. FISCHER.